United States Patent
Jain et al.

(10) Patent No.: US 10,301,396 B2
(45) Date of Patent: *May 28, 2019

(54) REDUCTION OF ENDOTOXIN IN POLYSIALIC ACIDS

(71) Applicant: Lipoxen Technologies Limited, London (GB)

(72) Inventors: Sanjay Jain, London (GB); Peter Laing, London (GB); Gregory Gregoriadis, London (GB)

(73) Assignee: Lipoxen Technologies Limited, London (GB)

( * ) Notice: Subject to any disclaimer, the term of this patent is extended or adjusted under 35 U.S.C. 154(b) by 561 days.

This patent is subject to a terminal disclaimer.

(21) Appl. No.: 14/968,858

(22) Filed: Dec. 14, 2015

(65) Prior Publication Data

US 2016/0096905 A1  Apr. 7, 2016

Related U.S. Application Data

(63) Continuation of application No. 13/557,149, filed on Jul. 24, 2012, now Pat. No. 9,212,232, which is a continuation of application No. 12/528,763, filed as application No. PCT/GB2008/050138 on Feb. 28, 2008, now abandoned.

(30) Foreign Application Priority Data

Feb. 28, 2007  (EP) .................................... 07103275

(51) Int. Cl.
| | |
|---|---|
| *C07K 1/00* | (2006.01) |
| *C07K 14/00* | (2006.01) |
| *C07K 17/00* | (2006.01) |
| *A61K 35/74* | (2015.01) |
| *C12P 19/28* | (2006.01) |
| *C12P 21/06* | (2006.01) |
| *C08B 37/00* | (2006.01) |
| *B01D 15/36* | (2006.01) |

(52) U.S. Cl.
CPC ........ *C08B 37/0006* (2013.01); *B01D 15/363* (2013.01); *C08B 37/0003* (2013.01)

(58) Field of Classification Search
None
See application file for complete search history.

(56) References Cited

U.S. PATENT DOCUMENTS

| | | |
|---|---|---|
| 5,039,610 A | 8/1991 | Rienstra et al. |
| 5,589,591 A | 12/1996 | Lewis |
| 5,846,951 A | 12/1998 | Gregoriadis |
| 6,891,037 B1 | 5/2005 | Hasler et al. |

FOREIGN PATENT DOCUMENTS

| | | |
|---|---|---|
| CN | 1896263 A | 1/2007 |
| CN | 1916010 A | 2/2007 |
| EP | 0046581 A2 | 3/1982 |
| EP | 0072513 A2 | 2/1983 |
| FR | 2848223 A1 | 6/2004 |
| JP | 6245786 A | 9/1994 |
| JP | 2005036036 A | 2/2005 |
| JP | 2006321890 A | 11/2006 |
| JP | 2007501889 A | 2/2007 |
| WO | 9304183 A | 3/1993 |
| WO | 9814603 A1 | 4/1998 |
| WO | 9832873 A1 | 7/1998 |
| WO | 9932653 A1 | 7/1999 |
| WO | 2000059927 A1 | 10/2000 |
| WO | 03094961 A1 | 11/2003 |
| WO | 2005003152 A1 | 1/2005 |
| WO | 2005026331 A2 | 3/2005 |
| WO | 2006016161 A1 | 2/2006 |

OTHER PUBLICATIONS

Database WPI Week 199440 thomson Scienffic, London, GB;AN 1994-321293XP2485583,& JP 6 245786 A (Nippon Glass Co Ltd( Sep. 6, 1994 (Sep. 6, 1994).
Database WPI Week 200520 Thomson Scientific, London, GB;AN 2005-18599XP2485270,& JP 2005 036036 A (Tanabe Seiyaku Co) Feb. 10, 2005 (Jan. 7, 2005).
Database WPI Week 200705 Thomson Scientific, London GB;AN 2007-037625XP248571,& JP 2006 321890 A (Kurare Medical KK) Nov. 30, 2006 (Nov. 30, 2006).
Database WPI Week 200741 Thomson Scientific, London, GB;AN 2007-421753XP2485584,& CN 1896263 A (Univ Jiangnan) Jan. 17, 2007 (Jan. 7, 2007).
Gregoriadis, et al., "Polysialic acids: potential in drug delivery," (1993) FEBS, vol. 315, No. (3), pp. 271-276.

*Primary Examiner* — Christopher R Tate
*Assistant Examiner* — Russell G Fiebig
(74) *Attorney, Agent, or Firm* — Entralta P.C.; Jeffrey M. McQuiston; Peter D. Weinstein

(57) ABSTRACT

The present invention relates to process for reducing the endotoxin content of a sample of fermentation broth containing polysialic acid and endotoxin comprising the sequential steps: (i) adding to the sample a base having a pKa of at least 12 to form a basic solution having a pH of at least 12, incubating the solution for a pre-determined time at a pre-determined temperature; and (ii) recovery of PSA, suitably by (iii) passing the sample through an anion-exchange column whereby polysialic acid is absorbed on the ion exchange resin; (iv) washing the column with one washing buffer, whereby polysialic acid remains absorbed on the ion exchange resin; and (v) eluting the polysialic acid from the column using an elution buffer to provide a product solution of polysialic acid having reduced endotoxin content.

25 Claims, No Drawings

REDUCTION OF ENDOTOXIN IN POLYSIALIC ACIDS

This continuation application claims priority pursuant to 35 U.S.C. § 120 to U.S. patent application Ser. No. 13/557,149, filed Jul. 24, 2012, which is a continuation application and claims priority to U.S. patent application Ser. No. 12/528,763, filed Mar. 19, 2010, which is a U.S. national stage entry from international PCT Patent Application PCT/GB2008/050138, filed Feb. 28, 2008, which claims priority to EP Patent Application 07103275.9, filed Feb. 28, 2007; each of which is hereby incorporated by reference in its entirety.

The present invention relates to the reduction of endotoxin in polysialic acid (PSA) and its conjugates by incubating with strong base, followed by recovery of PSA, usually by adsorption and elution from an anion exchange column. The purified PSA with reduced endotoxin content can be used to derivatise drug delivery systems, biological molecules, including protein and peptide drugs, which improves the pharmacokinetics and pharmacodynamics of drugs.

Polysialic acids are naturally occurring unbranched polymers of sialic acid produced by certain bacterial strains and in mammals in certain cells [Roth et. al., 1993]. They can be produced in various degrees of polymerisation from n=about 80 or more sialic acid residues down to n=2 by limited acid hydrolysis or by digestion with neuraminidases, or by fractionation of the natural, bacterially derived forms of the polymer. The composition of different polysialic acids also varies such that there are homopolymeric forms i.e. the alpha-2,8-linked polysialic acid comprising the capsular polysaccharide of *E. coli* strain K1 and the group-B meningococci, which is also found on the embryonic form of the neuronal cell adhesion molecule (N-CAM). Heteropolymeric forms also exist—such as the alternating alpha-2,8 alpha-2,9 polysialic acid of *E. coli* strain K92 and group C polysaccharides of *N. meningitidis*. Sialic acid may also be found in alternating copolymers with monomers other than sialic acid such as group W135 or group Y of *N. meningitidis*. Polysialic acids have important biological functions including the evasion of the immune and complement systems by pathogenic bacteria and the regulation of glial adhesiveness of immature neurons during foetal development (wherein the polymer has an anti-adhesive function) [Muhlenhoff et. al., 1998], although there are no known receptors for polysialic acids in mammals. The alpha-2,8-linked polysialic acid of *E. coli* strain K1 is also known as "colominic acid (CA)" and is used (in various lengths) to exemplify the present invention.

The alpha-2,8 linked form of polysialic acid, among bacterial polysaccharides, is non-immunogenic (eliciting neither T-cell or antibody responses in mammalian subjects, even when conjugated to immunogenic carrier proteins) which may reflect its status as a mammalian (as well as a bacterial) polymer. Shorter forms of the polymer (up to n=4) are found on cell-surface gangliosides, which are widely distributed in the body, and are believed to effectively impose and maintain immunological tolerance to polysialic acid. In recent years, the biological properties of polysialic acids, particularly those of the alpha-2,8 linked homopolymeric polysialic acid, have been exploited to modify the pharmacokinetic properties of protein and low molecular weight drug molecules [Gregoriadis, 2006; Jain et. al., 2003; U.S. Pat. No. 5,846,951; WO-A-0187922]. Polysialic acid derivatisation gives rise to dramatic improvements in circulating half-life for a number of therapeutic proteins including catalase and asparaginase, and also allows such proteins to be used in the face of pre-existing antibodies raised as an undesirable (and sometimes inevitable) consequence of prior exposure to the therapeutic protein. In many respects, the modified properties of polysialylated proteins are comparable to proteins derivatised with polyethylene glycol (PEG). For example, in each case, half-lives are increased, and proteins and peptides are more stable to proteolytic digestion, but retention of biological activity appears to be greater with PSA than with PEG [Hreczuk-Hirst et. al., 2002]. Also, there are questions about the use of PEG with therapeutic agents that have to be administered chronically, since PEG is only very slowly biodegradable [Beranova et. al., 2000] and high molecular weight forms tend to accumulate in the tissues [Bendele et. al., 1998; Convers et. al., 1997]. PEGylated proteins have been found to generate anti PEG antibodies that could also influence the residence time of the conjugate in the blood circulation [Cheng et. al., 1999]. Despite the established history of PEG as a parenterally administered polymer conjugated to therapeutics, a better understanding of its immunotoxicology, pharmacology and metabolism will be required [Hunter and Moghimi, 2002]. Likewise there are concerns about the utility of PEG in therapeutic agents that may require high dosages, since accumulation of PEG may lead to toxicity. The alpha-2,8 linked polysialic acid therefore offers an attractive alternative to PEG, being an immunologically invisible biodegradable polymer which is naturally part of the human body, and which degrades, via tissue neuraminidases, to sialic acid, a non-toxic saccharide. However the crude PSA is contaminated with high levels of endotoxin which limits its therapeutic utility.

Our group has described, in previous scientific papers and in granted patents, purification and fractionation of PSA and its utility in improving the pharmacokinetic properties of protein therapeutics [Gregoriadis, 2006, Jain et, al., 2004; U.S. Pat. No. 5,846,951; WO-A-0187922]. Now, we describe preparation of purified PSAs with reduced endotoxin content which can be used to produce PSA-derivatised proteins, and other therapeutic agents. These new materials and methods are particularly suitable for the production of PSA-derivatised therapeutic agents intended for use in humans and animals, in which the chemical and molecular definition of drug entities is of major importance due to medical ethics and the safety requirements of the regulatory authorities such as the FDA and EMEA.

Endotoxin (which is a lipopolysaccharide) was first defined by Richard Pfeiffer in 1892 as a heat stable toxic substance released upon disruption of microbial envelopes. The inflammatory response in the infected host results in the production of toxicity, which appears to be optimally adapted for the clearance of most local infections. However, an inflammatory response leading to septic shock and death may also occur when there is systemic distribution of severe infections.

This lipopolysaccharide (LPS) is utilized in most of the steps that occur during the presentation of endotoxin to the myeloid cells of the immune system and the production of inflammatory cytokines. The most potent component of LPS is lipid A and has become synonymous with endotoxin. Inflammatory mediators from bacteria like peptidoglycan, the diacylglycerylcysteine moiety of bacterial lipoproteins, and bacterial nucleic acid signatures, are also referred to as endotoxin. Recently, it has been discovered that Toll-like receptor (TLR4) is the lipid A inflammatory signal transducer. In addition, the signal transducers for different inflammatory mediators have been identified. The structure of endotoxin is important since its elucidation facilitates an understanding of how it can be removed.

LPS is made up of three parts: the proximal, hydrophobic lipid A region, which anchors LPS to the outer leaflet of the OM, the distal, hydrophilic O-antigen repeats, which extend into the aqueous medium, and the interconnecting core oligosaccharide. The O-antigen and core sugars although not essential for survival, provide bacterial resistance against various antimicrobial agents including detergents and the membrane attack complex of serum complement.

Wild-type cells that produce 0-antigen due to their glossy colony are known as 'smooth' and those which do not have 0-antigen are known as 'rough'. The molecules that contain the O-antigen polysaccharide are usually referred to as LPS and the molecules lacking O-antigen, as in *Neisseria*, are termed lipooligosaccharide or LOS. As Lipid A is essential for survival and is also a potent inflammatory mediator, it is now a target for the development of antibiotics and anti-inflammatory agents.

Many inflammatory mediators, in addition to LPS, can be regarded as endotoxins, including peptidoglycan, the diacyl glycerylcysteine moiety of bacterial lipoproteins, bacterial nucleic acid signatures and inactive endotoxins (produced by endotoxin mutant strains).

Modified lipid A structure has been used to develop novel endotoxin antagonists and immune adjuvants [Christ et al., 1995]. Determination of the biochemical details of lipid A structure and function helps to understand its role in bacterial pathogenesis and to intervene with novel treatments for infection [Bishop 2005].

Methods have been developed to reduce the endotoxin content of fluids. WO87/07531, for instance, describes the removal of endotoxin from endotoxin-containing fluids, such as blood, using polymyxin B immobilised on a solid phase support.

U.S. Pat. No. 6,942,802 B2 describes methods for removing bacterial endotoxin from a protein solution to recover protein. In this patent, immobilised metal affinity chromatography is used.

U.S. Pat. No. 6,713,611 B2 relates to a method of removing an endotoxin from a solution containing basic proteins. The method comprises adding a surfactant to the solution and loading the resultant solution onto a cation exchange column with subsequent recovery of the basic protein from the column.

U.S. Pat. No. 6,617,443 describes a method for removing endotoxins from a material from which nucleic acids are to be recovered. The endotoxins are removed by pre-incubating the nucleic acids in a salt-free detergent solution and subsequent anion exchange chromatography on a tentacle anion exchanger.

U.S. Pat. No. 5,169,535 describes a method for removing endotoxin from a solution containing protein and endotoxin, where the pH of the solution is adjusted to pH 9 or lower (the isoelectric point of the protein) and the solution is passed through a column packed with a cross-linked granular chitosan. The endotoxin is absorbed and the protein passes through.

U.S. Pat. No. 5,917,022 describe a process for the removal of endotoxin from a biological product such as proteins for therapeutic use, blood plasma fractions, and albumin solutions. This method comprises of binding endotoxin present in the said biological product to a cross-linked hydrophilic matrix made up of copolymer of allyl dextran and N,N'-methylene bisacrylamide, to which the endotoxin binds with some degree of specificity. This process is in the class of affinity chromatographic method.

U.S. Pat. No. 7,109,322 disclose a process for reducing or removing endotoxins from compositions containing therapeutic active substances, usually nucleic acids, extracted from natural sources by genetic engineering and/or biotechnology. For that purpose, the compositions being recovered from fermentation broth, for instance, are treated with chromatographic materials. The fractions of natural sources such as Eco fermentation broth obtained are centrifuged, lysed using 200 mM NaOH, 1% sodium dodecyl sulphate, filtered, then passed through an anion exchange column to which the nucleic acid preferentially (compared to endotoxin) absorbs. The nucleic acid is eluted with an elution buffer and recovered. In another example a metal affinity absorbent for endotoxin is used prior to the anion exchange column.

U.S. Pat. No. 6,699,386 B2 invention provides an absorbent having a high ability to absorb endotoxin selectively and a method of adsorbing endotoxin from a protein solution. The adsorbent is comprised of a basic substance bonded to a base material by means of a cross-linking agent.

U.S. Pat. No. 6,774,102 invention describes blood treating material having the capacity to selectively remove endotoxin and cytokine inducing substances from blood or plasma by extracorporeal adsorption for therapeutic septic shock treatment. They also provided methods and devices which used an adsorbent having a polydisperse oligopeptide of the invention immobilized on a solid state support medium for removing endotoxin from the blood of human or animal subject.

Methods have also been described for the removal of endotoxin from polysaccharide samples.

U.S. Pat. No. 5,589,591 discloses a process for producing a substantially endotoxin-free polysaccharide composition using a size separation technique, preferably ultrafiltration. The method is suitable for removing endotoxin from mannan, gum arabic and arabinogalactan recovered from their plant sources.

U.S. Pat. No. 5,039,610 describes a process for removing endotoxin from Gram-negative polysaccharides such as polyribosylribitol phosphate. Polysaccharide-containing powder derived from Gram-negative bacteria fermentation broth is solubilised to provide a divalent counter ion for endotoxin. Alcohol is added incrementally to induce lipopolysaccharide precipitation and the resultant material is mixed with a non-ionic resin, a detergent and a chelating agent.

However, to date, it remains a challenge to reduce the endotoxin content of a polysialic acid sample to an acceptable level for use in pharmaceuticals. Polysaccharide from fermentation broths has an anionic content and molecular weight very similar to endotoxin. The natural compound is also a lipopolysaccharide. For these reasons most purification techniques result in some copurification of PSA and endotoxin. The present invention overcomes these problems.

In accordance with a first aspect of the invention, we provide a process for reducing the endotoxin content of a sample containing polysialic acid and endotoxin comprising the sequential steps: (i) adding to the sample a base having a pKa of at least 12 to form a basic solution having a pH of at least 12, incubating the solution for a pre-determined time at a pre-determined temperature; and then (ii) recovering polysialic acid having reduced endotoxin content from the solution.

In one embodiment the recovery of PSA from the solution includes the steps: (iii) passing the base-treated solution through an anion-exchange column whereby polysialic acid is absorbed on the ion exchange resin; (iv) washing the column with one washing buffer, whereby polysialic acid remains absorbed on the ion exchange resin; and (v) eluting the polysialic acid from the column using an elution buffer to provide a product solution of polysialic acid having reduced endotoxin content. It is believed that at least some of the base-treated endotoxin product passes through the ion exchange column in the void volume.

In another embodiment the recovery step (ii) involves a salt-removal treatment step, i.e. based on size exclusion chromatography whereby higher molecular weight materials, such as polysaccharides are recovered free of salts. The invention is of particular utility for treatment of microbial fermentation broths.

The polysialic acid and endotoxin containing solution which is subjected to the base treatment of the process of the invention is preferably fermentation broth, usually the supernatant after centrifugation, or the product of preliminary treatment steps for removal of unwanted contaminants such as nutrients, lipids, proteins and nucleic acid. The sample may, however, contain protein which is not wanted in the final product as it is expected that this will be degraded by the base and the degradation products removed easily during the PSA recovery steps.

This process results in samples of PSA which have reduced endotoxin content and which are suitable for use in the preparation of pharmaceuticals. Surprisingly, to the skilled person, the use of the strong base does not result in degradation (of molecular weight) or deacetylation of the PSA. The skilled person would have avoided contact of PSA with a strong base such as NaOH where deacetylation is to be avoided, see for instance Moe et al. We have shown, however, that incubating with base followed by recovery of PSA eg by elution in an anion exchange column is a particularly effective method for reducing the endotoxin content of PSA, while not leading to chemical modification (deacetylation, for instance), nor molecular weight reduction.

In accordance with a second aspect of the invention, there is provided a sample of PSA material having reduced endotoxin content obtainable by the above process.

The endotoxin content should be reduced to a pharmaceutically acceptable level. Preferably, the endotoxin content of the sample, after the process of the invention, is less than 25 EU/mg of PSA material. Accordingly, a third aspect of the invention provides a sample of PSA comprising an endotoxin content of 25 EU/mg of PSA material, or less, measured using the LAL test. Preferably, the endotoxin content is in the range 0.05-25 EU/mg of PSA material. The present invention provides samples of PSA itself and PSA-conjugate (eg biological molecule, or drug delivery system conjugate) (hereinafter referred to as PSA material) that have a low endotoxin content.

The process of the invention is carried out under conditions that provide useful yields of PSA. It is possible to avoid contamination of PSA with affinity ligands such as polymyxin B, or polycations such as poly-D-lysine, that are commonly used in affinity adsorbents designed to remove endotoxin either by omitting the use of such materials completely or using them under conditions at which no degradation of the matrix occurs (under which endotoxin removal may not be optimised). This 'purified' PSA may be used to derivatise therapeutic agents, such as proteins, and used in the human body without the risk of endotoxin toxicity.

The endotoxin level is measured using the LAL test as described in European Pharmacopoeia 5.0, Appendix XIVC.

In step (i) of the process, the sample is added to a base having a pKa of at least 12. Without being bound by theory, it is thought that the base cleaves bonds, probably ester bonds in the endotoxin, rendering it inactive, and/or allowing removal of the reaction products. To have utility in the process of this invention the base must therefore be sufficiently strong to react and hydrolyse the endotoxin. It is surprising that the endotoxin concentration reduced without substantially destroying the polysialic acid, for instance by deacetylating the N-acetyl groups or cleaving the polysialic acid chains.

Preferably, the base has a pKa of at least 13, more preferably at least 14. The base preferably forms a basic solution having a pH of at least 13, more preferably at least 14. The sample is typically incubated in the base in a suitable buffer, for instance HEPES buffer, or water.

Suitable bases for use in the present invention are NaOH, KOH, $Ca(OH)_2$ and LION. Particularly preferred is NaOH. NaOH at a concentration of 2N is suitable.

Step (i) is carried out for a pre-determined time which typically ranges from 5 minutes to 24 hours, preferably from 30 minutes to 6 hours. The pre-determined temperature is typically in the range 0° C. or 60° C. and is preferably 2° C. to 40° C. Higher temperatures and/or longer times may lead to undesirable degradation of PSA itself.

In one embodiment of the invention, the incubation in step (i) is carried out for 2 hours at 20° C. with constant stirring. Step (i) may be immediately followed by an additional step in which the sample is neutralised. Neutralisation may be performed, for instance with HCl, to achieve a final solution pH of around 7.4.

A suitable method making use of ion exchange chromatography on which steps (iv) and (v) may be based is described in our earlier Patent Application, WO2006/016161. This method can be adapted for use in the present invention, where it is not necessary to separate the PSA, at this stage, into fractions of different average molecular weight. In that prior art method, polysialic acid is separated into fractions of different average molecular weight. Aqueous solution of PSA is contacted with anion exchange resin in a column whereby PSA is adsorbed. The PSA is then subjected to selective elution by aqueous elution buffers, and the PSA is recovered from eluted fractions. The selective elution involves washing the resin in the column with at least one elution buffer. If more than one elution buffer is used, each may have different ionic strength and/or pH, in which the second and subsequent buffers have higher ionic strength and/or pH than the buffers of the immediately preceding step. The fractionation process using ion exchange leads to a small reduction in endotoxin content.

In preferred embodiments of the process of this invention, the sample is passed through an anion exchange column after having been treated with the base. The sample may need to be prepared before loading onto the column, for instance, it may need to be diluted. At least some of the endotoxin will pass through the column and it is preferred that the loading buffer is selected such that PSA is full adsorbed and at least some endotoxin fails to be adsorbed. Examples of loading buffers are described below.

Step (iv) of the method is a washing step, in which a low ionic concentration elution buffer is washed through the column. For instance such an initial wash step may be carried out with a buffer having a salt concentration of 100 mM or less. Typically, the washing buffer comprises triethanolamine and has a pH around 7.4. This initial step may wash out low molecular weight contaminants. The washing step may involve a volume of at least 1, preferably at least 1.5 column volumes, based on the volume of the ion exchange resin column. During this step, substantially all of the polysialic acid remains on the ion exchange resin. More than one washing step may be performed. The second washing buffer may be identical to the first, or alternatively, comprise an alcohol and/or a surfactant. Suitable examples of surfactants are nonionics such as PEG, Tween 20 and 80 and Triton. The washing steps may remove further endotoxin from the column.

It is to be noted that a column of anion exchange resin may have a diameter of the cross-section which is greater than the height or may, as in a conventional column, have a height which is greater than the diameter of the cross section. The volume may be in the range 1 to 5000 ml. The height of the column may be in the range 1 cm to 5000 cm. The cross sectional area may be in the range 1 cm to 5000 $cm^2$. The cross section may be of any shape but is preferably round.

After the anion-exchange resin washing step, the PSA is eluted using elution buffer. The elution buffer used in step (v) generally has a relatively higher ionic strength than the washing buffer, in order to remove the PSA from the column. Typically, the elution buffer comprises NaCl at a concentration of at least 0.4M.

We have found that it is preferred for the elution step of the preferred embodiment to use at least 1.0, preferably at least 1.25 and most preferably at least 1.5 column volumes of the respective elution buffer. Preferably no more than 3 column volumes of elution buffer are used. The flow rate for a 75 ml matrix is preferably 7 ml/minute.

The preferred embodiment of the process may comprise more than one, for instance at least 5, for instance as many as 20 or, generally in the range 6 to 12, sequential steps of elution with elution buffers of successively increasing ionic strength. The ionic strength in the first of these essential steps is generally in the range 1 mM to 1M. In this manner, eluted polysialic acid may be fractionated into samples having different average molecular weight.

Preferably the ionic strength of an elution buffer is varied by varying the level of a salt of a strong mineral acid and a strong mineral base, preferably sodium chloride.

After step (v) has been performed, and the product solution obtained, steps (i) and (iii) to (v) may be repeated. Preferably, steps (iii)-(v) are repeated.

The PSA may be further treated. Subsequent steps may include further purification and/or concentration steps. With regard to further steps, these generally involve steps in which the polysaccharide is isolated from any salt, for instance using membranes, for instance ultra-filtration membranes. Such steps may additionally allow concentration of the PSAs to form more highly concentrated solutions. Such solutions may be subjected to additional steps of membrane treatment, for instance successive ultra-filtration or other filtration steps.

The anion-exchange elution buffer may contain a volatile acid or base and in this case the further steps may involve volatilisation of the volatile base from the eluted fractions. Although it is possible to recover the PSA from aqueous solutions by precipitation techniques, for instance involving non solvents for the PSAs, it is preferred that no such solvents are utilised, since this may make final isolation from the respective solvents more difficult. Consequently the final step of recovery preferably involves evaporation of the water and, preferably, any remaining volatile buffer components remaining from the elution steps. In a preferred case wherein triethanolamine is present, both the triethanolamine cation and acetate anion are volatile and can easily be removed under vacuum.

The PSA may be finally isolated from solution by drying, preferably under reduced pressure. This is preferably performed by freeze-drying.

Precipitation, preferably using a non solvent, may be carried out as a preliminary step to fractionation to remove a portion of the population and decrease polydispersity of the higher molecular weight fractions. Preferably, differential ethanol precipitation is used.

The process may comprise an additional step, either before step (i), between steps (i) and (ii) or after step (ii). This may involve hydrophobic interaction chromatography (HIC), affinity chromatography, such as immobilised metal affinity chromatography (IMAC) or size exclusion chromatography (SEC).

A suitable HIC column is one to which endotoxin is adsorbed but to which PSA does not adsorb, such as Phenyl FF. The loading buffer is typically ammonium sulphate, sodium chloride etc. in deionised water, or deionised water adjusted to pH 7.4.

HIC is preferably carried out before step (i). In fact, it is believed that this is the first disclosure of use of HIC for the removal of endotoxin from a sample of PSA. It is surprising that HIC can be used to remove endotoxin without co-removal of polysialic acid such as recovered from fermentation broth, i.e. in the form of a lipopolysaccharide, or vice versa, for instance where PSA material is conjugated to render it more hydrophobic than endotoxin. By appropriate selection of column and conditions endotoxin will adsorb to the column while PSA material passes through or vice versa, either into the void column (with loading buffer) or by eluting with suitable elution buffer. In accordance with a further aspect of the invention we therefore provide a novel process for reducing the endotoxin content of a sample containing polysialic acid and endotoxin comprising passing the sample through a hydrophobic interaction column to which endotoxin adsorbs, whereby PSA passes through the column and is collected to provide a product solution of polysialic acid having reduced endotoxin content. According to a yet further aspect of the invention we provide a novel process for reducing the endotoxin content of a sample containing polysialic acid and endotoxin comprising passing the sample through a hydrophobic interaction column to which the PSA material adsorbs, whereby endotoxin passes through the column and PSA material is adsorbed, and then PSA material is eluted and collected to provide a product solution of polysialic acid having reduced endotoxin content. The use of a phenyl column is preferred, as this binds to endotoxin whilst allowing PSA to pass through the column. In the first embodiment, after passage of the void volume containing endotoxin, the column may be washed with a washing buffer and washing fractions collected, which may also comprise PSA. The second embodiment is of particular utility for purifying PSA conjugates with proteins, such as relatively hydrophobic proteins.

Affinity filtration media may be used in the process of the present invention usually after step (ii). Affinity matrices are selected which specifically trap endotoxin. Conditions are selected such that PSA is not adsorbed when the solution is loaded. It may often be preferred to avoid use of endotoxin-specific affinity chromatography, to avoid contamination by degradation products of the matrix. Preferably, where any such process step is included, the conditions are selected to avoid such degradation. Although such conditions may be selected at the expense of optimising endotoxin removal, when combined with the essential steps of the process of the invention in a multistep process the endotoxin level can be reduced to acceptable levels In one embodiment of the present invention, affinity matrix comprising an immobilised endotoxin-binding agent is used to purify the PSA sample. A suitable agent is a polymyxin B gel, in particular Detoxi-Gel™.

The Detoxi-Gel™ Endotoxin Removing Gel uses immobilized polymyxin B to bind and remove pyrogens from solution. The polymyxins are a family of antibiotics that contain a cationic cyclopeptide with a fatty acid chain. Polymyxin B neutralizes the biological activity of endotoxins by binding to the lipid A portion of bacterial lipopolysaccharide. Studies performed by Kluger et. al., (1985) indicate that the immobilized polymyxin B inactivates some but not all endotoxins.

The immobilized polymyxin B gel is a stable affinity matrix that resists leaching of ligand into the valuable preparation. Making use of an affinity support permits easy cleanup of buffers, cell culture media, solutions containing macromolecules such as proteins, and pharmacologically important components. Detoxi-Gel™ Endotoxin Removing Gel also has been used to remove endotoxin from nucleic acid (DNA) samples (Wicks et. al., 1995).

Typically, before a polymyxin B gel is used, it must first be degassed. Gels may be regenerated by washing, typically with a detergent, for instance sodium deoxycholate, followed by washing to remove the detergent. A suitable agent to wash the gel is pyrogen-free water. Once generated, the gel is applied to the column and pyrogen free buffer, or water, are added. The column incubation time is typically one hour. Once the sample has been collected, it is typically lyophilized to prevent bacterial contamination.

A Cellufine™ column is another type of affinity chromatography column, that may be used to reduce the endotoxin content of the PSA sample. Such a column is typically equilibrated with 2-8, for instance 5 column volumes of endotoxin free buffer, for instance HEPES buffer (pH 7.4). HEPES may also be used as the loading buffer. Cellufine is a particularly suitable material to use as it has low non-specific binder of PSA.

Other commercially available endotoxin-selective affinity chromatography columns are the EndoTrap columns. An EndoTrap Red™ column can also be used to reduce the endotoxin content of the PSA sample. Such a column is typically equilibrated with 5-10, for instance 5 column volumes of endotoxin free buffer, for instance with Regeneration Buffer Red™ and 20 mM HEPES buffer (pH 7.4) or with deionised water (pH 7.4). HEPES or deionized water (pH 7.4) may also be used as the loading buffer.

An EndoTrap Blue™ column may be used to reduce the endotoxin content of the PSA sample. Such a column is typically equilibrated with 5-10, for instance 5 column volumes of deionised water (pH 7.4), supplemented with 50-100 µM $Ca^{+2}$.

In the process according to the first aspect of the invention, the sample may be subjected to additional purification means. For instance, the sample may be subjected to one or more preliminary steps of incubation with a surfactant, a chelating agent, a base, an organic solvent, an oxidant or a peroxidase, before step (i), between steps (i) and (ii) or after step (ii).

Preferably, the surfactant is an anionic surfactant, for example, sodium dodecyl sulphate (SDS). Alternatively, the surfactant may be 0.5% Triton X 114 or 1% Triton X 100 or 114. Alternatively cationic surfactants, e.g. bactericidally-effective surface active compounds such as cetyltrimethyl-ammonium, bromide may be used. A suitable incubation time is 1 hour. Temperatures in the range 0-50° C. are suitable, although 35-37° C. is preferred.

Where a nonionic surfactant is used the solution is loaded onto an anion exchange column for removal of nonionic surfactants. Here, 20 mM TEA buffer can be used.

In one embodiment of the present invention, the PSA sample is incubated with 1% SDS/2N NaOH in HEPES buffer for 1 hour, and then the solution is loaded onto a column to remove salt and anionic surfactant, for instance, a GPC column, and fractionated with a suitable buffer, typically HEPES buffer. A pd10, Sephadex 25 column may be used.

Alternatively, other nonionic surfactants having different cloud points to Triton, such as Tween 20 and Tween 80, can also be used to reduce endotoxin content of the PSA sample. The PSA sample is incubated in 0.1% Tween 80 for 30 minutes at room temperature. Then the solution is loaded onto an anion exchange column with a suitable buffer or deionised water (pH 7.4) for removal of surfactants. The column is washed extensively with water and buffer (pH 7.4) to remove surfactant.

In embodiments the process includes an oxidation step. This step is intended to oxidise the end unit of polysialic acid to render it reactive, e.g. with proteins or peptides. It may simultaneously lead to a reduction in endotoxin content and thus be a useful step to achieve the overall objective of endotoxin reduction. Suitable oxidants are sodium periodate, superoxide, hypochlorite and peroxidase.

The process of the invention may comprise use of phase extraction, diafiltration precipitation and/or use of dry heat before step (i) or after step (ii). When dry heat is used, typically the PSA sample is heated in a vial to a temperature in the range 100-200° C., most preferably around 150° C. for 1-6 hours, typically around 4 hours. These conditions do not deactivate or degrade PSA.

Diafiltration may be used subsequent to incubation of the PSA sample with a surfactant, or alternatively, used independently of surfactant treatment. The filter should be small enough to retain at least higher molecular weight PSA whilst allowing endotoxin to pass through. A typical ultrafiltration apparatus with a cutoff of 5 kDa for globular proteins has pores sufficiently large to allow passage of endotoxin (.about.10,000 Da) whilst retaining PSAs of .about.20,000 and above. A diafiltration step is preferably used after the base treatment, e.g. as part of recovery step (ii).

The process of the present invention provides PSA with reduced endotoxin content to pharmaceutically acceptable levels, for human or veterinary use. Ideally, the endotoxin content of the product PSA is less than 25 EU/mg PSA. Preferably, the endotoxin content of the PSA is in the range 0.05-25 EU/mg.

The present invention may be of utility for producing PSA conjugates having low endotoxin content. In a PSA conjugate preferably the conjugated moiety is preferably a biological molecule, more preferably a protein. PSA protein conjugates may be produced by a variety of methods, in particular see our previous Patent Applications WO-A-0187922 and WO92/22331. The process according to the first aspect of the invention is generally unsuitable for PSA-biological molecule conjugates since the base typically damages the biological moiety, i.e. any conjugation is not carried out prior to step (i). In a fourth aspect of the invention there is provided a process comprising the sequential steps: (v) PSA conjugate—endotoxin mixture is contacted with a nonionic surfactant for a predetermined time at a predetermined temperature; (vi) the surfactant-treated sample is passed through an anion-exchange column whereby the PSA conjugate is adsorbed on the column; (vii) the PSA conjugate is eluted from the column using an elution buffer to produce a PSA conjugate solution having reduced endotoxin content.

Examples of nonionic surfactant to be used in this aspect are for instance PEG compounds, sorbitan monooleate Tween 20/80 or a member of the series Triton. Again, without wishing to be bound by theory, it is believed that the surfactant reduces endotoxin levels by disrupting endotoxin micelle formation, or by dissolving endotoxin.

The product of the fourth or first aspect of the invention may be a pharmaceutical composition, in which case, the endotoxin content should be low enough to avoid toxic side effects when the composition is administered to a human or animal. The composition may be a human or veterinary pharmaceutical composition.

Typically, PSA samples, before purification, i.e. the starting material for step (i) of the first aspect and step (v) of the fourth aspect have an endotoxin content in the range 1000-200,000 EU/mg. In order to be pharmaceutically acceptable, the final endotoxin content of the sample must be no more than 25 EU/mg. The permissible endotoxin content is dependent upon the intended use of the PSA. If the PSA is to be used to derivatise a protein to be used as a medicament, the permissible endotoxin content varies with the dose of protein to be used as a medicament—higher doses typically require more stringent removal of endotoxin.

For PSA-protein conjugates used in pharmaceutical compositions with a human (veterinary) dose of 10-500 mg, the endotoxin content should be no more than 0.5 EU/mg, and is preferably in the range 0.05-0.5 EU/mg. For PSA-protein conjugates with a human dose of 1-10 mg, the endotoxin content should be no more than 5 EU/mg, and is preferably in the range 0.5-5 EU/mg. For PSA-protein conjugates with a human dose of up to 1000 µg, the endotoxin content should be no more than 25 EU/mg, and is preferably in the range 5 to 25 EU/mg.

In the invention sample containing endotoxin and PSA is conveniently a fermentation broth. The fermentation broth may be produced recombinantly or be naturally occurring PSA-producing microbial broth, a hydrolysis product thereof or a fractionalized derivative of either of these. The microbes may be *E. coli* K1, *Neisseria meningitidis*, or *Moraxella liquefaciens*. Typically, the process according to the first aspect of the invention comprises a preliminary step in which the microbes are fermented to produce a fermentation broth. The PSA may be a poly(2,8-linked sialic acid), poly(2,9-linked sialic acid) or an alternating 2,8-2,9-linked PSA. Preferably, the PSA is colominic acid (CA) or an oxidised, reduced, aminated and/or hydrazide derivative thereof.

The PSA typically has at least 2, preferably at least 5, more preferably at least 10, for instance at least 50 saccharide units. Typically, PSAs of most utility have a weight average molecular weight of up to 100 kDa.

The PSA may be derived from any source, preferably a natural source such as a bacterial source, e.g. *E. coli* K1 or K92, group B meningococci, or even cow's milk or N-CAM. The sialic acid polymer may be a heteropolymeric polymer such as group 135 or group V of *N. meningitidis*, or may be synthesized e.g. enzymatically. The PSA may be a block copolymer, such as a conjugate of a homo poly(sialic acid) with a block of another naturally occurring polymer or synthetic polymer. The PSA may be in the form of a salt or the free acid. It may be in a hydrolysed form, such that the molecular weight has been reduced following recovery from a bacterial source. The PSA in the starting material for a process of the invention may be material having a wide spread of molecular weights such as having a polydispersity of more than 1.3, for instance as much as 2 or more. Preferably the polydispersity of molecular weight is less than 1.2, more preferably less than 1.1, for instance as low as 1.01.

The derivatisation of proteins and drug delivery systems with the purified PSA may result in increased half-life, improved stability, reduced immunogenicity, and/or control of solubility and hence bioavailability and pharmacokinetic properties, or may enhance solubility actives or viscosity of solutions containing the derivatised active.

Preferably the PSAs of the final product of the process aspects of the invention and of the new products have 2-1000 sialic acid units, for instance 10-500, more preferably 10 to 50 sialic acid units. Preferably, the polydispersity of the PSA will be less than 2, ideally less than 1.2, and ideally in the range 1.01 to 1.10.

The purification methods used in the present invention advantageously reduce the polydispersity of the PSA, in addition to reducing the endotoxin content.

The endotoxin content of a sample of PSA is reduced by the process of the invention by at least 5-fold, preferably at least 10-fold, most preferably at least 100, 200, 500 fold and in some embodiments up to 1000, 10,000, 100,000 or even 1 million told. Preferably the base treatment and recovery reduces the endotoxin content at least 5-fold. The overall reduction by preliminary steps and multiple PSA-recovery steps may lead to a reduction of at least $10^5$ fold. Generally the combination of recovery steps is selected such that endotoxin reduction is maximised while PSA recovery is maximised by the use of steps which are complementary to one another in terms of endotoxin fraction removal.

The "Assay for Endotoxin" (LAL test) section of the Examples describes how the endotoxin content may be measured.

EXAMPLES

Reference Assay for Endotoxin

To perform the assay for endotoxin, The Endosafe—PTS (Portable Test System) from Charles River Laboratories was used. This is based on the LAL (Limulus Amoebocyte Lysate) assay.
Instrument Operation
All required information was entered into the reader. Once all the test information had been entered, the reader displayed "add sample; press enter". The PSA samples were prepared, unless otherwise specified at 1 mg/ml in 20 mM TEA buffer at pH 7.4. 25 µL of sample was pipetted into all four sample reservoirs and enter key was pressed on the reader. The pump drew sample aliquots into the test channel and the results were produced in 15-20 minutes. When the test was completed the instrument displayed the endotoxin measurement and the assay acceptance criteria on the screen. The instrument gave the following specifications: Sample EU/mL, sample % CV, spike EU/mL, spike % CV and % spike recovery.

Example 1

Endotoxin Reduction Using Sodium Hydroxide 6 mg/ml solution of colominic acid contaminated with endotoxin (31 kDa unoxidised) was prepared in 0.5M NaOH Hepes buffer and was incubated at room temperature for 10 minutes. Then 0.5 ml solution was loaded on size-exclusion chromatography desalting column and the fraction collected was discarded. The column was then washed with 2.5 ml HEPES buffer and the fraction was collected followed by collection of another 2 ml fraction with HEPES buffer. The elution fractions collected were then analysed for colominic acid content by resorcinol assay. The fractions containing colominic acid were then pooled together and were analysed for endotoxin content. The samples were tested for degree of deacetylation of the PSA. FIG. 1 shows the Native PAGE of colominic acid in 0.5 M NaOH and 1% SDS HEPES buffer solution.

There was a 53-fold reduction in endotoxin content using NaOH and there was no detectable degree of deacetylation. Nor is any breakdown of CA observed in the PAGE using NaOH and SDS.

Example 2

Reduction of Endotoxin by Anion Exchange after Base

A sample taken directly from *E. coli* K1 fermentor (1 mg/ml) in 20 mM TEA buffer (pH 7.4) was measured and found to be more than $10^5$ EU/mg. Then NaOH was added to the PSA solution to make final normality of 2N NaOH in PSA sample solution and then it was incubated for 2 hours at room temperature with gentle mixing. The pH of the solution was recorded. The HiTrap QFF (1 ml) column was washed with 10 column volume deionised water (pH 7.4) and then column was equilibrated using 10 column volumes of 20 mM TEA. The conductivity of the sample solution was measured and was diluted appropriately with 20 mM TEA buffer to match the conductivity of buffer solution. The sample solution was then loaded on QFF (1 ml column) at the rate of 1 ml/min and the void volume (.about.⅓ column volume) was collected separately. 1 ml fractions were collected. The column was then washed with 20 mM TEA and washing fractions of 1 ml each was collected. The sample was then eluted with 1M NaCl in 20 mM TEA and the fractions were collected. Resorcinol assay of the elution samples was performed to calculate the amount of colominic acid present in the samples and the endotoxin content of the pooled elution samples containing colominic acid was determined. The endotoxin level of the product was found to be reduced to 1407 EU/mg, i.e. more than about.71 fold. The recovery of PSA was 91%.

The base treatment and recovery by anion exchange was repeated taking above product and further reduction in endotoxin content was seen, down to less than 300, i.e. a further 5-fold reduction.

Example 3

Reduction of Endotoxin by Anion Exchange after Nonionic Surfactant Treatment

Triton X-100

Endotoxin content of the original sample (1 mg/ml) in 20 mM TEA buffer (pH 7.4) was measured. Colominic acid solution (35 mg/ml contaminated with endotoxin) was prepared in 1% Triton X 100 and was incubated for 2 hours at room temperature. The pH of the solution was measured. The HiTrap QFF column was prepared as in Example 2 and the sample was prepared and loaded as in Example 2. The column was then washed with 20 mM TEA and washing fractions of 1 ml each were collected. The sample was then eluted with 1M NaCl in 20 mM TEA and the fractions were collected. Resorcinol assay of the elution samples was performed to calculate the amount of colominic acid present in the samples and the endotoxin content of the pooled elution samples containing colominic acid was determined. Where the loading of colominic acid was 7.28 mg, the endotoxin content of the starting material was reduced from 4023 to 1511 EU/mg, i.e. about 3 fold. Recovery was 97%.

Example 4

Reduction of Endotoxin by Nonionic Surfactant Treatment (Triton X 114) and Anion Exchange 1% Triton X 114 solution was prepared and was added to PSA solution derived from fermentation broth by standard centrifugation, lysis, diafiltration ad ultrafiltration in appropriate amount to make the final concentration of 0.5% Triton X 114 and was incubated for 2 hours at room temperature. The pH of the solution was measured. The HiTrap QFF column was prepared, loaded, washed and eluted as in Example 3 and the endotoxin content of the pooled elution samples containing colominic acid was determined. The starting endotoxin level of more than $10^5$ EU/mg was reduced to around $2.3 \times 10^4$ EU/mg, i.e. by around 4 fold.

Example 5

Reduction in Endotoxin by Base/Anion Exchange Followed by Nonionic Surfactant and Anion Exchange Colominic acid solution product of a different fermentation broth was treated by base by the process of Example 2 and then treated with Triton X 114 as below, then anion exchange.

1% Triton X 114 solution was prepared and was added to PSA solution in appropriate amount to make the final concentration of 0.5% Triton X 114. The solution becomes cloudy at room temperature (25° C.). To make the solution clear, it was kept in ice for 10-15 mins. Again the solution was kept at room temperature for 20 mins to make it cloudy. The cloudy solution was centrifuged and two layers were separated: upper layer containing PSA and lower layer of Triton X 114 containing endotoxin. The upper layer was kept to load on to the QFF column. The HiTrap QFF column was prepared, loaded, washed and eluted as in Example 4.

In this case the level of endotoxin was reduced from over $10^5$ to around 4.4 to $10^3$ EU/mg in the first base treatment step and further to $8.2 \times 10^2$ EU/mg after the second surfactant step and anion exchange.

Example 6

Reduction of Endotoxin by Nonionic Surfactant Treatment (Tween 80) and Anion Exchange Colominic acid solution (100 mg/ml contaminated with endotoxin; 2.5 g batch) was prepared in 0.1% Tween 80 and the pH was adjusted to 7.4. The solution was incubated for 30 minutes at room temperature and diluted to 500 ml with water pH 7.4. The HiTrap OFF column (75 ml) was washed with 10 column volume deionised water (pH 7.4) and then the column was equilibrated using 10 column volumes of water pH 7.4. The sample solution was then loaded at the rate of 7 ml/min at room temperature. The loading fractions were collected in fractions of 50 ml falcon or as appropriate. The first 25 ml of loading out was collected separately which accounts for the void volume of the column. Column was then washed with 0.01% Tween 80 in water pH 7.4 (7 ml/min, 4 CV) and washing fractions of 75 ml each were collected. The column was then washed with water pH 7.4 (7 ml/min, 4 CV) and collected the washing fractions of 75 ml or as appropriate. The column was then washed with 150 mM sodium chloride in water pH 7.4 (7 ml/min, 8 CV) and collected the fractions of 75 ml or as appropriate. The sample was then eluted with 500 mM sodium chloride in water pH 7.4 and collected the elution fraction of 75 ml or as appropriate. The samples were collected at room temperature. Resorcinol assay of the elution samples was performed to calculate the amount of colominic acid present in the samples and the endotoxin content of the pooled elution samples containing colominic acid was determined.

Example 7

Endotoxin Removal by Hydrophobic Interaction Chromatography

2M Ammonium sulphate in deionised water/deionised water was used as the loading buffer. 500 µg of Colominic Acid (7 kDa produced in Reference Example 1) was dissolved in 500 µL of loading buffer and the solution was loaded on the HIC columns specified in the Table below. The columns were then incubated for one hour. Elution samples were collected and resorcinol assay was performed to estimate the amount of colominic acid in the elution samples. Elution samples containing colominic acid were pooled and analysed for endotoxin content.

| Column Used | Loading Buffer | Colominic Acid (µg) | Original Endotoxin Content (EU/mg) | Final Endotoxin Content (EU/mg) |
|---|---|---|---|---|
| Butyl FF | 2M (NH$_4$)$_2$SO$_4$ | 336.95 | 3070 | 211 |
| Phenyl FF | 2M (NH$_4$)$_2$SO$_4$ | 353.80 | 3070 | 148 |
| Octyl FF | Deionised Water | 379.49 | 3070 | 214 |

Endotoxin content was reduced by up to 14.5 fold. The order of Endotoxin reduction by different columns were in order: Phenyl>Butyl.gtoreq.Octyl.

Example 8

Endotoxin Removal Using Anionic Surfactant (Sodium Dodecyl Sulphate)

6 mg/ml solution of colominic Acid (31 KDa contaminated with endotoxin) was prepared in 1% SDS HEPES Buffer and was incubated for 1 hour at 37° C. Then 0.5 ml solution was loaded on Pd10 column and the fraction collected was discarded. The column was then washed with 2.5 ml HEPES buffer and the fractions were collected. The column was then eluted with 2 ml HEPES buffer. The elution fractions collected were then analysed for colominic acid content by resorcinol assay. The fractions containing colominic acid were then pooled together and were analysed for endotoxin content.

Endotoxin content was reduced from >10 exp 6 EU/mg to 741.6 EU/mg. The recovery of the PSA was 84%.

Reference Example 1

Fractionation Using Anion Exchange

A new prepacked column (1000 ml; Q Sepharose FF, GE Healthcare) was prepared and the preservative was washed with three column volumes of deionised water, and then with 3 column volumes of wash buffer at a flow rate of 50 ml/min. The pump tubing was filled with start buffer (triethanolamine buffer, pH 7.4; 20 mM) and the column was connected to the pump and a few drops of start buffer were applied to the top of the column to avoid introducing air into the column. Colominic acid solution derived from E. coli fermentation broth contaminated with endotoxin was prepared in triethanolamine buffer and the pH of the solution was adjusted to 7.4. The sample (colominic acid (CA) was obtained from Marukin, Japan) 750 ml in wash buffer) was then applied to column at the rate 50 ml/min, followed by washing of the column with another 750 ml of wash buffer. The column was then washed with 1500 ml washing buffer. The bound CA was eluted with 1500 ml of different elution buffers from 100 mM NaCl to 475 mM NaCl collecting washings from each run and transferring them in respective containers. All residual CA and other residues were removed with 1500 ml 1 M NaCl and the washings were collected. The column was then regenerated with 3 column volumes of wash buffer. The column was then stored in 20% ethanol at RT. The large chain length samples (removed by the high salt eluent) were then concentrated to minimum volume in 250 ml concentrators (Vivacell, Vivascience) under 4 bar pressure at 4° C. The concentrates were washed four times with distilled water (pH 7.4 adjusted with NaOH). The small chain length samples were also concentrated in 50 ml concentrators (Vivaflow, Vivascience) under pressure at 4° C. The concentrate was washed four times with distilled water. Samples were assayed for colominic acid content by resorcinol assay. The samples were then analyzed for endotoxin content.

The results show that the endotoxin level was reduced from a value of 1.6.times.10 exp 5 EU/mg to 3070 EU/mg. There was almost a 5 fold reduction in the endotoxin content.

Reference Example 2

Affinity Chromatography—Detoxi Gel Column Purification

The Detoxi gel columns were regenerated using pyrogen free solutions to prevent introducing any endotoxin into the sample. All the solutions were degassed before applying to the column to prevent air bubbles from clogging the column and reducing the flow. Detoxi-gel endotoxin removing gel may be used at least 10 times without loss of activity. All the solutions and gel were equilibrated to room temperature before use.

The gels were degassed by placing slurry in the bottom of a suction filter flask with a magnetic stirrer. While the slurry was stirred an aspirator was used to create a vacuum within the flask. The gel was degassed for approximately 15 minutes. The appropriate sized column was packed with degassed slurry and the gel was allowed to settle down for 30 minutes. The gels were regenerated by washing with five column volumes of 1% sodium deoxycholate, followed by 3-5 column volumes of a pyrogen free water to remove excess. The gels were regenerated before each use following the same procedure. The sample was then applied to the column. Aliquots of pyrogen free buffer or water were added and the flow through was collected. The sample emerged from the column after the void volume collection was completed (94% of the bed volume). For greater efficiency, the bottom and top caps were replaced after sample has entered the gel bed. The column was incubated for at least one hour, the top and bottom caps were removed sequentially. Pyrogen free buffer or water was then added to collect the samples. Caution was taken to prevent sample contamination from dust or dirty glassware subsequent to endotoxin removal in all these experiments. Samples were then frozen and stored. The columns were regenerated following the same procedure as above to remove any bound endotoxin and were stored in 25% ethanol at 2-8° C.

In the first example, the sample is the product of a process as disclosed in Example 3 of WO2008/012525, of colominic acid fractionated by the techniques described in WO2006/016161 conjugated to GCSF. The conjugate prior to affinity gel treatment had an endotoxin level of 438 EU/mg, and after treatment the level was reduced to 10.5 EU/mg. Endotoxin content of PSA-protein conjugates was reduced up to 35 times using this affinity chromatography material.

In a second example the sample was neat colominic acid used under the following conditions:

| Formulation | PSA (mg/ml) [Resorcinol assay] | Amount of PSA (mg) | Vol | pH |
|---|---|---|---|---|
| PSA 19.3 KDa (Marukin) | 0.1749 | 0.1574 In Hepes buffer (20 mM Hepes, 150 mM NaCl; pH 7.4) | 0.9 ml | 7.4 |

Endotoxin content was reduced to 4.2 EU/mg from original value of 16,000 EU/mg. The recovery was more than >90%.

In a third exemplification the starting material was the solution produced in Reference Example 1, under the following conditions. The results are shown below:

| Formulation | PSA (mg/ml) [Resorcinol assay] | Amount of PSA (mg) | Volume | Endotoxin Content (EU/mg) |
|---|---|---|---|---|
| CA 7 kDa | 0.374 | 1.87 | 5 ml | 66.04 |
| CA 7 kDa | 0.160 | 0.8 | 5 ml | 178.75 |

Original endotoxin content in the sample was 3070 EU/mg. The reduction in the endotoxin content was up to 47 fold.

CONCLUSION

Endotoxin-specific affinity chromatography may be used to remove endotoxin from polysialic acid and conjugates thereof, i.e. we have shown that it is possible to select conditions under which endotoxin binds to the column while PSA does not bind but can instead be recovered in a convenient form and with very low endotoxin level. The step may thus be useful to treat PSA products of base (or surfactant) treatment.

Reference Example 3

Endotoxin Removal Using Affinity Column (Cellufine)

This Example is similar to Reference Example 2 but uses a different endotoxin-removing affinity column. Cellufine ET clean column (S beads) was regenerated by washing with 5 column volumes of 0.2M NaOH, 2M NaCl and then with endotoxin free water. The column was then equilibrated with 5 column volumes of suitable endotoxin free buffer (HEPES Buffer). The colominic acid solution produced in Reference Example 1 in HEPES buffer (1 mg/ml) was then applied to the column at a flow rate of 0.1-0.2 ml/min. at 21° C. The total amount loaded was 218 µg. The column was then incubated for one hour and then the elutions were collected with HEPES buffer. Resorcinol assay of the elution samples was performed to calculate the amount of colominic acid present in the samples and the endotoxin content of the pooled elution samples containing colominic acid was determined.

The endotoxin level was reduced from 3070 to 75 EU/mg i.e. amount 40-fold.

The method was repeated using the GCSF-PSA conjugate used as the starting material for Reference Example 2 part 1, reducing the endotoxin level from 438 to 12.4 EU/mg.

We conclude that the Cellufine column is suitable for removing endotoxin from PSA.

Reference Example 4

Removal of Endotoxin Affinity Column (EndoTrap Red)

This example uses another affinity column for endotoxin adsorption. Endotrap Red column was regenerated and equilibrated using deionised water pH 7.4. 10 ml of 50 mg/ml colominic acid solution contamination with endotoxin was prepared. Two columns were kept in series. The sample solution was loaded onto the column and the void volume was collected (.about.⅓ of the column volume). Then remaining loading solution was collected. Then the column was washed with 6 column volume deionised water pH 7.4 and the fractions of 1 ml each was collected. Resorcinol assay for all the fractions was performed to calculate the amount of colominic acid present and the endotoxin content of the samples containing colominic acid was determined.

The results for 16 kDa colominic acid show a reduction in endotoxin level from 564 to 6 EU/mg, a reduction of around 90 fold.

The procedure was also used for an endotoxin-contaminated insulin-PSA conjugate produced by the method described in WO2008/012528. The endotoxin content was reduced from 111 to 12.5 EU/mg, a 9-fold reduction.

These examples show that another column is useful for removal of endotoxin from PSA and conjugates thereof.

Reference Example 5

Removal of Endotoxin Through Affinity Column Using HEPES Buffer

Endotrap Red column (1 ml column volume) was regenerated with regeneration Buffer Red provided with the column. The column was then equilibrated using 5 column volumes of suitable endotoxin free 20 mM HEPES Buffer. The endotoxin-contaminated PSA solution in HEPES buffer (750 µg/ml) was then applied to the column at a flow rate of 0.1-0.2 ml/min at 21° C. Then the column was eluted using 0.3 ml of 20 mM HEPES buffer. Resorcinol/protein assay of the elution samples was performed to calculate the amount of colominic acid present in the samples and the endotoxin content of the pooled eluted samples containing colominic acid was determined. The results show that the endotoxin level may be reduced by around 2 to 7 fold, and that this is affected by the load of PSA used (lower loads on the column give better reductions) at loading levels at which 100 PSA recovery is achieved.

Reference Example

Removal of Endotoxin, Proteins, DNA and Cell Debris Through Anion Exchange Column Using 30% IPA Fermentation broth recovered by centrifugation, supernatant recovery, diafiltration and ultrafiltration, with a colominic acid concentration of 35 mg/ml was prepared and its pH was measured. The HiTrap OFF column was washed with 10 column volume deionised water (pH 7.4) and column was equilibrated using 10 column volumes of 20 mM TEA. The conductivity of the sample solution was measured and was diluted appropriately with 20 mM TEA buffer to match the conductivity of buffer solution. The sample solution was then loaded at the rate of 1 ml/min fractions were collected separately. Then 1 ml of fractions was collected. Column was then washed with 30% IPA and washing fractions of 1 ml each was collected. The sample was then eluted with 1M NaCl in 20 mM TEA and the fractions were collected. Resorcinol assay of the elution samples was performed to calculate the amount of colominic acid present in the samples and the endotoxin content of the pooled elution samples containing colominic acid was determined. The initial endotoxin content or the broth extract was $3.2\times10^4$ EU/mg and the final content was $1.8\times10^3$ EU/mg, i.e. the endotoxin content was reduced by 18 fold.

The invention claimed is:

1. A method for reducing the content of an endotoxin in a sample that contains a polysialic acid (PSA) and the endotoxin, the method comprising:
    a) adding a base having a pKa of at least 12 to the sample to form a solution having a pH of at least 12; wherein the PSA in the sample has a weight average molecular weight of up to about 100 kDa;
    b) incubating the sample for a time period ranging from 5 minutes to 24 hours;
    c) passing the sample through an anion-exchange column;
    d) washing the column with a wash buffer; and
    e) recovering the PSA from the anion exchange column, wherein the recovered PSA sample has a reduced endotoxin content.

2. The method of claim 1, wherein the base has a pKa of at least 13 and/or the pH of the formed solution is 13.

3. The method of claim 2, wherein the base has a pKa of at least 14 and/or the pH of the formed solution is 14.

4. The method of claim 1, wherein the time period ranges from 30 minutes to about 6 hours.

5. The method of claim 4, wherein the time period is about 2 hours.

6. The method of claim 1, wherein the PSA includes a poly(2,8-linked sialic acid), a poly(2,9-linked sialic acid), an alternating a poly(2,8-2,9-linked sialic acid), or an oxidized, a reduced, an aminated, or a hydrazide derivative thereof.

7. The method of claim 6, wherein the PSA is colominic acid or an oxidized, a reduced, an aminated, or a hydrazide derivative thereof.

8. The method of claim 1, wherein step (a) is carried out at a temperature ranging from 0° C. to about 60° C.

9. The method of claim 8, wherein the temperature ranges from 2° C. to about 40° C.

10. The method of claim 9, wherein the temperature is about 20° C.

11. The method of claim 1, wherein in step (d) the washing buffer is a low ionic strength washing buffer.

12. The method of claim 11, wherein the low ionic strength washing buffer has a salt concentration of 100 mM or less.

13. The method of claim 1, wherein the reduced endotoxin content is 25 EU/mg or less.

14. The method of claim 13, wherein the reduced endotoxin content is 5 EU/mg or less.

15. The method of claim 14, wherein the reduced endotoxin content is 0.5 EU/mg or less.

16. The method of claim 1, wherein step (a), step (b), step (c), step (d) and/or step (e) are repeated.

17. The method of claim 1, wherein step (c), step (d) and/or step (e) are repeated.

18. The method of claim 1, further comprising neutralizing the sample after step (b).

19. The method of claim 18, wherein the sample is neutralized to a pH of about 7.4.

20. The method of claim 1, wherein the sample recovered in step (e) is volatilized to remove a volatile acid and/or a volatile base.

21. The method of claim 1, wherein the sample recovered in step (e) is treated to form a more highly concentrated PSA sample.

22. The method of claim 1, wherein the sample recovered in step (e) is further purified to remove salt.

23. The method of claim 1, wherein the sample recovered in step (e) is precipitated to reduce polydispersity.

24. The method of claim 1, further comprising passing the sample through a hydrophobic interaction chromatography column, an affinity chromatography column or a size exclusion column before step (a) or after step (e).

25. The method of claim 1, further comprising incubating the sample with a surfactant, a chelating agent, an organic solvent, an oxidase and/or a peroxidase before step (a) or after step (e).

* * * * *